US006397170B1

United States Patent
Dean et al.

(10) Patent No.: US 6,397,170 B1
(45) Date of Patent: May 28, 2002

(54) SIMULATION BASED POWER OPTIMIZATION

(75) Inventors: Alvar A. Dean; Kenneth J. Goodnow, both of Essex Junction; Scott W. Gould; Sebastian T. Ventrone, both of South Burlington, all of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/135,825

(22) Filed: Aug. 18, 1998

(51) Int. Cl.$^7$ ............................................. G06F 17/50
(52) U.S. Cl. ............................. 703/14; 703/18; 716/4; 716/2
(58) Field of Search ......................... 703/14, 18; 716/4, 716/2

(56) References Cited

U.S. PATENT DOCUMENTS

| | | | |
|---|---|---|---|
| 4,342,093 A | 7/1982 | Miyoshi | 703/14 |
| 4,527,249 A | 7/1985 | Van Brunt | 703/15 |
| 4,698,760 A | 10/1987 | Lembach et al. | 716/6 |
| 4,775,950 A | 10/1988 | Terada et al. | 703/15 |
| 4,791,593 A | 12/1988 | Hennion | 703/14 |
| 5,047,971 A | 9/1991 | Horwitz | 703/14 |
| 5,349,542 A | 9/1994 | Brasen et al. | 703/15 |
| 5,379,231 A | 1/1995 | Pillage et al. | 703/14 |
| 5,404,310 A | 4/1995 | Mitsuhashi | 716/13 |
| 5,535,370 A | 7/1996 | Raman et al. | 703/15 |
| 5,598,532 A | 1/1997 | Liron | 703/2 |
| 5,649,166 A | 7/1997 | Saldanha et al. | 716/2 |
| 5,655,109 A | 8/1997 | Hamid | 716/18 |
| 5,696,694 A | * 12/1997 | Khouja et al. | 716/5 |
| 5,768,145 A | * 6/1998 | Roethig | 703/14 |
| 5,815,416 A | * 9/1998 | Liebmann et al. | 703/18 |
| 5,838,947 A | * 11/1998 | Sarin | 703/14 |
| 5,949,689 A | * 9/1999 | Olson et al. | 703/14 |
| 6,151,568 A | * 11/2000 | Allen et al. | 703/14 |

OTHER PUBLICATIONS

Eisenmann, W. et al. "Power Calculation for High Density CMOS Gate Arrays" Euro ASIC '91, May 27–31, 1991, pp. 198–203.*
"LSI Low Power Oriented Layout Method with Net Switching Factors", IBM Technical Disclosure Bulletin, vol. 36, No. 06B, pp. 505–507, 1993.
Tiwari et al., "Technology Mapping for Low Power", 30th ACM/IEEE Design Automation Conference, pp. 74–79 1993.
Chandrakasan et al., "Hyper–LP: A System for Power Minimization Using Architectural Transformations", IEEE, pp. 300–303, 1992.
Hachtel et al., "Re–Encoding Sequential Circuits to Reduce Power Dissipation", ACM, pp. 70–73, 1994.
Murgai et al., "Decomposition of Logic Functions for Minimum Transition Activity", IEEE, pp. 404–410, 1995.
Courdert et al., "What is the State of the Art in Commercial EDA Tools for Low Power?", ISLPED, pp. 181–187, 1996.
Tsui et al., "Technology Decomposition and Mapping Targeting Low Power Dissipation" 30th ACM/IEEE Design Automation Conference, pp. 68–73, 1993.
Alidina et al., "Precomputation–Based Sequential Logic Optimization for Low Power", ACM, pp. 74–81, 1994.
"Optimum Routing of Critical Timing Paths", IBM Technical Disclosure Bulletin, vol. 30, No. 12, pp. 300–302, 1988.
Benini et al., "State Assignment for Low Power Dissipation", IEEE 1994 Custom Integrated Circuits Conference, pp. 136–139, 1994.

* cited by examiner

*Primary Examiner*—Kyle J. Choi
(74) *Attorney, Agent, or Firm*—Schmeiser, Olsen & Watts; Mark F. Chadurjian

(57) ABSTRACT

A system and method for designing a low power ASIC using weighted net toggle information. In particular, the system and method includes a simulation system that executes a set of application test suites that is representative of the code that will likely run on the ASIC and weights each of the applications. The weighted net toggle information can then be evaluated and utilized to modify the ASIC design.

2 Claims, 4 Drawing Sheets

BEFORE

AFTER a: High Performance/ Power b: Low Performance/ Power

BEFORE

AFTER

SIMULATION BASED POWER OPTIMIZATION

BACKGROUND OF THE INVENTION

1. Field of the Invention

This invention relates to low power designs for application specific integrated circuits (hereinafter "ASIC"), and more particularly to a system and method for designing ASIC devices that are optimized for power.

2. Background of the Invention

Low power designs in electronic systems are becoming increasingly more important as personal and mobile devices, such as laptop computers and cellular phones, become more popular. Because battery life represents a critical limitation in such devices, the importance of providing low power designs has become an important design constraint. Incorporated into many of today's electronic systems are powerful ASIC devices designed to provide a high degree of functionality for a particular device or type of application. As such, ASIC's tend to be large consumers of power. Unfortunately, traditional tools for designing integrated circuits (IC's) often do not consider power reduction to be as critical as other design criteria, such as area and speed. Accordingly, today's design tools lack the sophistication to adequately optimize an ASIC device for power reduction.

ASIC's are logic chips designed by the end-customers to perform a specific function and thereby meet the specific needs of their application. Customers implement their designs in a single silicon die by mapping their functions to a set of predesigned, preverified logic circuits provided by the ASIC vendor. These circuits are referred to as the ASIC vendor's library, and are described in the ASIC vendor's databook. These circuits range from the simplest functions, such as inverters, NANDs and NORs, flip-flops and latches, to more complex structures such as static memory arrays, adders, counters and phase-lock loops. Recently vendors have added some highly complex circuits to their ASIC libraries, such as microprocessors, Ethernet® functions, and peripheral component interconnect (PCI) controllers.

The process of creating a lower power ASIC design is currently a manual one aided by various software tools. The logic designer typically studies node toggle and power calculation reports and makes architectural or structural changes to the high level netlist to quiet down or turn off areas of the design that do not need to be powered up at all times. This is typically done by shutting off the clocks to certain regions of the design or holding previous data steady when a change in data is not required for proper functioning of the ASIC.

In recognition of this problem, ASIC software tool vendors are starting to address this area of low power design with different tools to evaluate design power. One method uses a dynamic gate-level power simulator that models non-linear power consumption behavior. Other tools perform a gate level power analysis for making quick estimates during synthesis process. A paper entitled: "What Is The State Of The Art In Commercial EDA Tools For Low Power," by Coudert, Haddad and Keutzer, of Synopsys, Inc., ISLPED 1996 Monterey, Calif. USA, discusses such methods and is hereby incorporated by reference.

Unfortunately, none of these tools take a dynamic approach to power optimization. Specifically, none recognize the fact that typical ASIC designs, such as those designed for embedded systems, are built to execute a relatively well defined set of applications (i.e., program instructions) stored in read only memory (TOM). Thus, no known methods exist for designing power optimized ASIC devices based on the applications that will likely run on the ASIC.

SUMMARY OF THE INVENTION

The present invention provides a system and method for dynamically optimizing ASIC designs to reduce power consumption. The present invention recognizes the fact that the toggling of nets between states (e.g., high to low) directly correlates to power consumption. To identify frequently toggling nets, the present invention simulates the operation of an ASIC design with a set of applications similar to those that will eventually run on the ASIC device. The output of the simulation comprises net toggle information, which details how often each net toggles during typical usage of the ASIC. The simulation process also includes a mechanism for weighting each of the applications such that more frequently used applications are given more weight when determining the net toggle information.

The net toggle information may be utilized at two different stages of the design process. First, net toggle information may be generated at the behavioral or RTL (register transfer level) design levels, when the ASIC design is represented in a high level logic language such as VHDL (VHSIC Hardware Description Language) or Verilog. By performing simulations as described above, fundamental architectural modifications to reduce power consumption can be implemented by the designer based on the net toggle information. Secondly, net toggle information can be generated at the gate design level, after the ASIC design has been synthesized and physically laid out. The net toggle information generated at the gate level, together with physically extracted net capacitance and RC delay data, can then be fed back into the synthesis process to optimize the ASIC for power reduction. This process can be repeated until an acceptable design is achieved.

It is therefore an advantage of the present invention to provide weighted net toggle information.

It is therefore a further advantage of the present invention to provide a system for dynamically designing an ASIC device using feedback data that profiles the likely operation of the ASIC device.

It is therefore a further advantage of the present invention to provide a method and system for reducing power consumption in an ASIC device.

DETAILED DESCRIPTION OF THE INVENTION

1. ASIC DESIGN OVERVIEW

Figure 1:
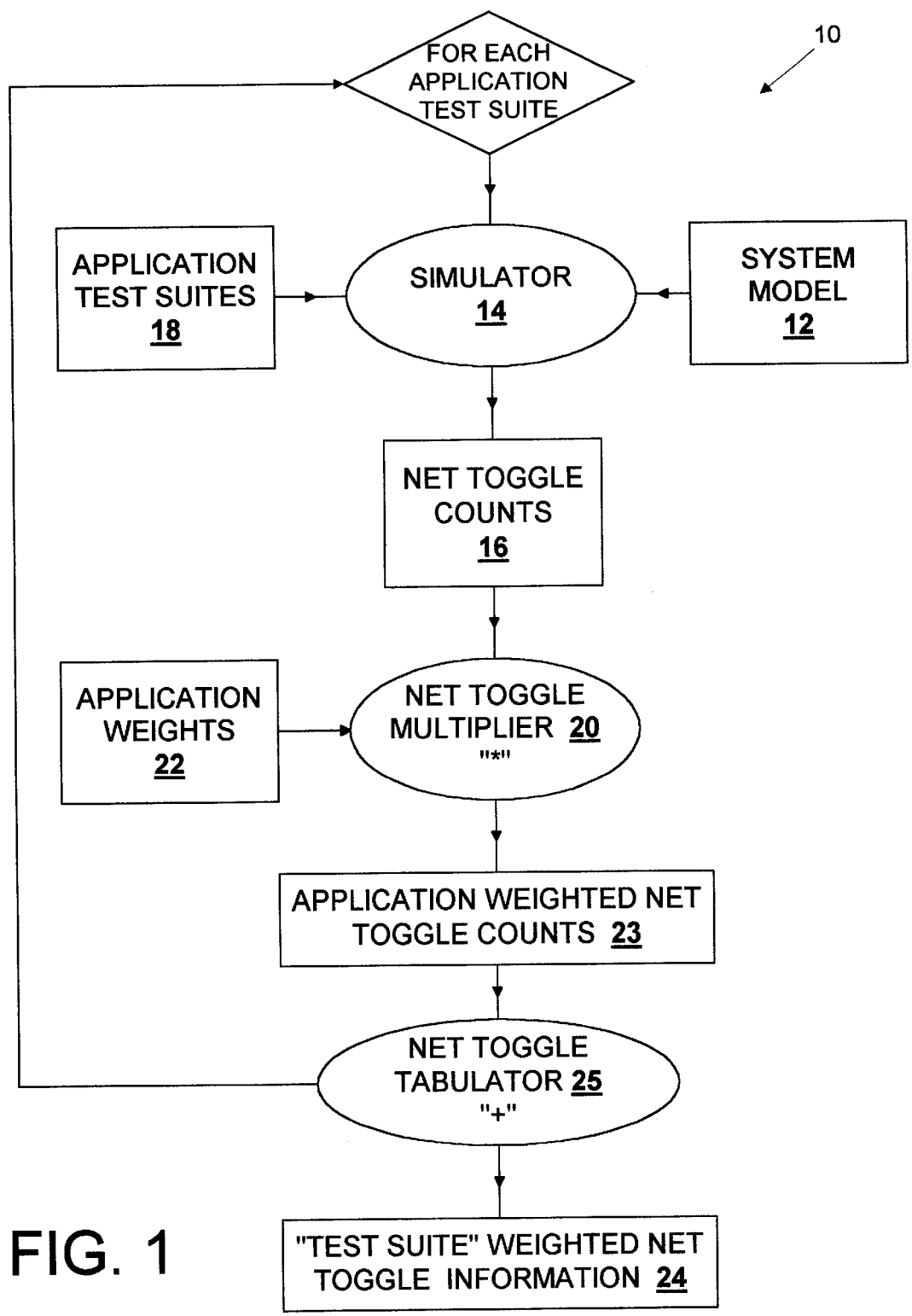
FIG. 1 depicts a flow diagram of a method for determining weighted net toggle information in accordance with an exemplary embodiment of the present invention.

An initial step in creating an ASIC chip is to first reduce the logic requirements of the chip into a computer readable HDL format. After entering in an HDL, the designer begins the process of analyzing what was entered to determine if it correctly implements the intended function. The traditional method is through simulation, which evaluates how a design behaves. Simulation is a mature, well-understood process, and there are many simulators available that accept HDL's written in VDHL, Verilog, or increasingly, both languages. Simulators are available from various CAD vendors, such as Verilog-XL™ and Leapfrog™ from Cadence; VSS™ from Synopsis; and MTI™ from Model Technology, Inc.

A more recent addition to the design analysis phase is power analysis, with many new CAD tools coming to market in the last year. For a growing number of customers, the power consumption and dissipation of their designs are becoming critical factors. Early feedback on the power requirements of a design allows designers to make timely basic design trade-offs in order to achieve power targets. Because the analysis at the behavioral level is technology-independent, the estimates may not be extremely accurate and may vary as much as 50% from the actual silicon implementation.

The next step in implementing an ASIC design involves Technology Mapping, which takes a technology-independent description of a design, and maps it to a library of logic circuits provided by an ASIC vendor, thereby making the design technology-dependent. This phase seeks not just a correct mapping, but the most efficient one in terms of the customer requirements. The optimization process is divided into subprocesses including logic synthesis, test insertion, clock planning and insertion, and floorplanning.

Logic synthesis is the basic step that transforms the HDL representation of a design into technology-specific logic circuits. An ASIC vendor provides the logic circuits in a form called a "synthesis library." As the synthesis tool breaks down high-level HDL statements into more primitive functions, it searches this library to find a match between the functions required and those provided in the library. When a match is found, the synthesis tool copies the function into the design (instantiates the circuit) and gives it a unique name (cell instance name). This process continues until all statements are broken down and mapped (synthesized) to logic circuits. There are potentially hundreds, or even thousands, of different combinations of logic circuits that can implement the same logical function. The combination chosen by a synthesis tool is determined by the synthesis constraints provided by the designer. These constraints define the design's performance, power, and area targets. A design driven primarily by performance criteria may use larger, faster circuits than one driven to minimize area or power consumption.

The inputs to the logic synthesis process are the HDL design description (VDHL or Verilog), the design constraints, and the synthesis library by the ASIC vendor. The output of the synthesis process is a list of circuit instances interconnected in a manner that implements the logical function of the design. This list of interconnected circuit instances is called a netlist and can be written in several different formats or languages. The dominant netlist languages are VDHL, Verilog, and Electronic Design Interchange Format (EDIF). The interconnected circuit may also be graphically represented as schematics.

2. POWER REDUCTION

In CMOS circuits, power dissipation can be broken down into two main classes: dynamic and static power. Static power is consumed regardless of circuit activity, while dynamic power is a result of energy consumed in charging circuit capacitors when the circuits are switching. The present invention relates to the reduction of average dynamic power.

The average dynamic power for a CMOS gate can be approximated by the classical equation: $POWER = \frac{1}{2} * V_{dd}^2 * C_{output} * N_{sw}$, where $C_{output}$ is the output capacitance of the gate, $N_{sw}$ is the number of times the gate switches per second, and $V_{dd}$ is the voltage supplied to the gate. This equation is only an approximation because the internal gate power consumption is not taken into account. A more accurate power model is one in which all the circuit capacitance's are taken into account (i.e., both internal gate capacitance and output load capacitance).

ASIC libraries may provide a power model for each library element that contains internal segment power capacitance data. These models can work with either net-only switching factors, where the only information available is how often a net switches per second, or pin-pair switching factors, where information about which input pin caused a transition to which output pin is available. If only net switching information is available, the power calculator must approximate internal pin-pair switching factors based upon the number of inputs to the gate.

The power consumption in the ASIC power models may be a function of gate type, input pin transition edge, output pin transition edge, slew rate of the input pin, state of the gate, process corner, Vdd, temperature, and capacitive load on the output pin. CMOS dynamic power is directly proportional to the transition time (slew rate) between one state and another. The traditional timing tools (without power calculation capability) have only de-powered gates, based on output capacitance, to reduce power while meeting the timing objective of a net. The present invention considers tools that minimize the gate power based on input slew rate while meeting the net timing objectives, in some cases "powering up" logic books to faster slew rates to minimize "cross over" current. Cross over current is the temporary current consumed by a CMOS transistor stack while transitioning from one state to another.

A power reduction methodology must support power consumption feedback at both the HDL and gate level. More accurate power reduction calculations can be done at the gate level than at the HDL level, however, a basic correlation must exist between them to assure that the benefits of power reduction changes at the HDL level result in corresponding reductions at the gate level.

Finding a set of representative applications that will yield power consumption close to the average power of the hardware is critical. In an embedded application such as wireless handsets, the microprocessor function is limited to the application code embedded in the ROM. The range of applications is typically bounded, i.e., embedded applications spend most of their powered-up cycles in certain segments of code. This bounded code can confidently be used to characterize average dynamic operating power.

Since dynamic power consumption is directly proportional to the amount of switching activity at the behavioral (HDL) level, switching activity can approximate the power consumption. Net and bus switching factors at the gate level can be calculated as the result of HDL logic simulation. Although behavioral level switching activity cannot be exactly correlated to the gate level power results, it can identify hot spots where the designer should focus his/her efforts. Once a baseline behavioral switching factor information is obtained, pass to pass comparisons of the HDL changes can verify the reduction of switching activity, and thus dynamic power.

Once a gate level netlist is available, more accurate power calculations are possible.

Assuming gate power models are available, the accuracy of the power analysis is limited by the quality of the parasitic capacitance information. An estimate of net capacitive loads can be obtained using wire-load models that calculate the net capacitance based on fan out and design size. Once the design is fully placed and routed, an accurate resistance and capacitance network model can be used for improved power calculation accuracy. The post-wiring parasitic power calculation serves as a good starting point for an initial power minimization run through the logic synthesis process.

Logic synthesis selects logic gate size based on net capacitance and/or slew driven power minimization. Slew driven power optimization finds the optimal slew rate for power consumption that may result in higher or lower books being selected (gates powered up or down).

An Exemplary Embodiment

FIG. 1 depicts a generic simulation system that generates weighted net toggle information 24 from a suite of application tests 18. As described above, weighted net toggle information 24 is to be used as feedback information during the design cycle of the ASIC device in order reduce power consumption. Weighted net toggle information 24 contains statistical information regarding the toggling frequency for each of the nets in the ASIC device. In general, by identifying nets that toggle most frequently, design changes can be implemented to reduce the power impact caused by the high toggling nets. Since power consumption is directly proportional to net toggle frequency, by targeting the nets with a high net toggle frequency, design changes that have the largest impact on dynamic power can be made. System model 12 refers to any known computer-based representation of an IC device, including high level representations such as Verilog or VHDL, and low level netlist representations such as EDIF (Electronic Design Interchange Format), and simulator 14 refers to any know simulation system that can simulate the operation of system model 12.

This invention seeks to exploit the fact that because the required operations of an ASIC are typically specified before an ASIC is actually designed and built, it is possible to write the application software (or at the very least provide a good test suite) ahead of time, before or during the ASIC design process. With the application software or test suites, simulations can be run on the ASIC system model to generate net toggling information that will reflect a reasonably accurate profile of how the ASIC will operate. Accordingly, a suite of application tests 18 that will approximate the actual operation of the ASIC is utilized. Each application test will attempt to approximate one of the actual software applications that will run on the ASIC to perform some unique operation.

Net toggling frequencies are calculated by running each application test 18 on the system model 12 within the simulator 14. The simulator 14 simulates the execution of each application test 18 on the system model 12 and generates a net toggle count 16 for the relevant application. Any known type of simulation may be run on each of the application test suites 18, including zero delay, unit delay, or variable delay logic simulations. Zero delay indicates that all logic blocks or gates have a delay of zero between the input and output, unit delay indicates a delay of one time unit, and variable delay indicates that each gate or block has a uniquely assigned delay.

Once the net toggle count 16 is collected for the particular application within the application test suite 18, net toggle multiplier 20 weights the net toggle count 16 based on a predetermined application weight 22. An application weight 22 is an estimate of how often a given application will be executed with respect to the other applications. For instance, a weight may be calculated as a percentage of the entire operating life of the ASIC that the application is expected to be running. Accordingly, if a first application is estimated to run ten percent of the time the ASIC is in operation, it would be given an application weight (App_Weight) of 0.1, and its net toggle count (Net_Toggle) would be multiplied by 0.1 to provide an application weighted net toggle count 23. Accordingly, the application weighted net toggle count 23 is equal to Net_Toggle×App_Weight. Once an application weighted net toggle count 23 is determined, the process is repeated for each application in the test suite 18. A net toggle tabulator 25 sums the application weighted net toggle count 23 for each application, and ultimately generates "test suite" weighted net toggle information 24. Accordingly, the process for collecting the test suite weighted net toggle information 24 can be defined by the following formula:

$$\sum_{i=0}^{n} Net\_Toggle_i \times App\_Weight_i$$

where i=all of the applications in the test suite.

By weighting the net toggle counts (i.e., Net_Toggle), and then summing the results for each application, a power usage profile for the ASIC is obtained. Since the intent is to extend battery life, there is more concern with average long term power, and less concern with peak instantaneous power. Average long term power requires an averaged weighted node toggle statistic that weights the application node toggle according to the percentage of time that the application is likely to run on the system.

Figure 2:
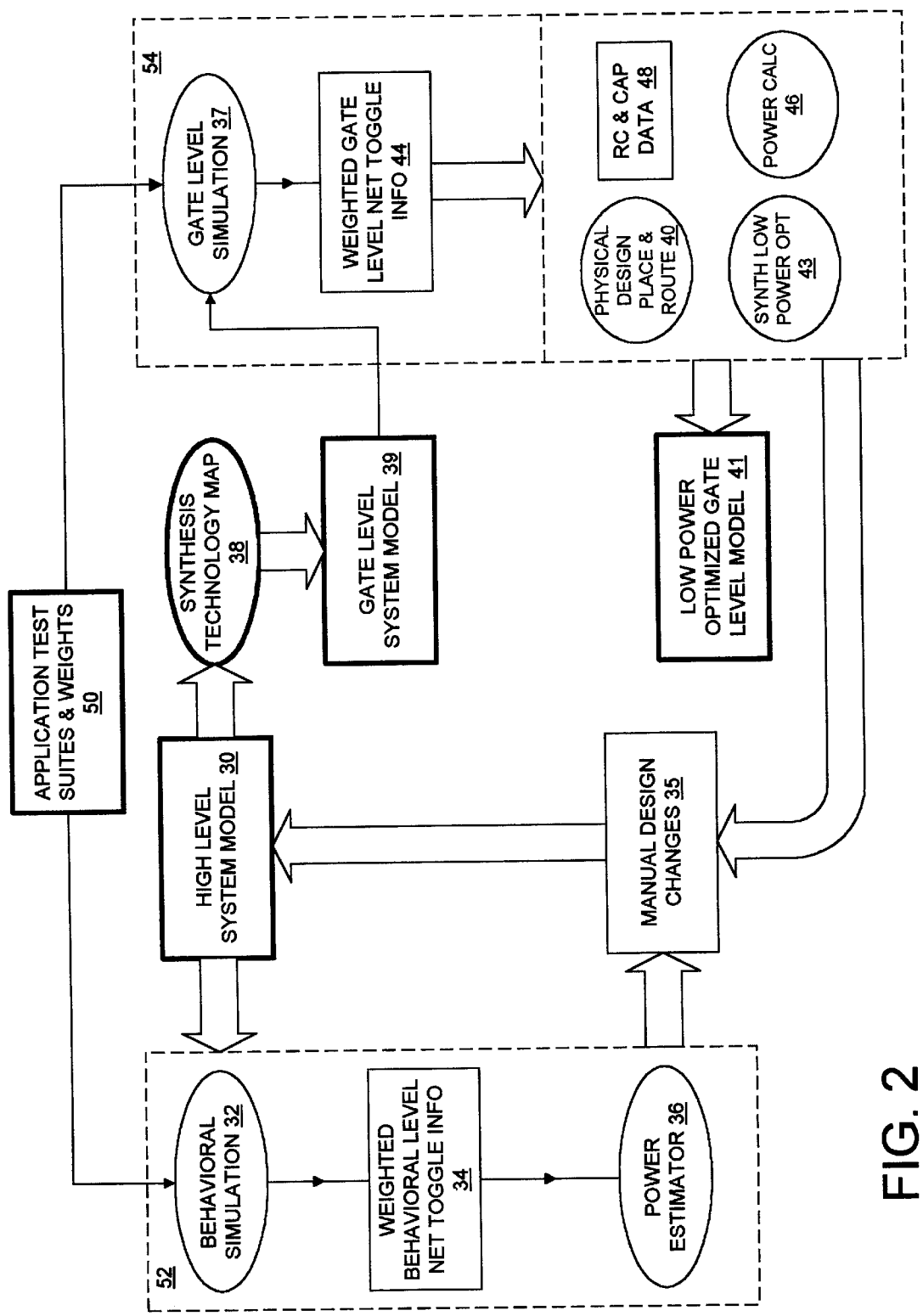
FIG. 2 depicts a flow diagram of a power optimization technique in accordance with an exemplary embodiment of the present invention.

The results of the simulation system 10 described in FIG. 1 can be utilized during the ASIC design process for power optimization. FIG. 2 describes a simulation based design process that utilizes weighted net toggle information 34 and 44 at two design levels, namely, at both the behavioral/RT (Register Transfer) 52 and gate 54 design levels. The behavioral level 52 is associated with the initial process of designing and simulating an ASIC device with a high level software model, such as with VHDL or Verilog, in order to define the logical behavior of the ASIC. The gate level 54 is associated with the process of designing and simulating a functional implementation of the high level system model with circuitry mapped to a specific vendor's ASIC technology.

At the behavioral level 52, a high level system model 30 of an ASIC device is inputted into a behavioral simulation system 32 that generates weighted net toggle information 34 according to the process of FIG. 1. A power estimator 36 is used to analyze the weighted net toggle information 34 to determine if any changes need to be made to the high level system model 30. The power estimator 36 provides a guess as to the power requirements of a design based upon the number of blocks each gate is connected to, along with net toggle information 34. Since no technology specific information is available at this stage, the power cannot be calculated with accurate electrical equations. Nonetheless, design choices made at the behavioral level 52 during the initial design stages can be re-examined and manually changed 35 based upon the results of the behavioral level power estimator 36. The behavioral level changes will typically involve causing the system model to use different circuits to achieve the same logic. For example, a VHDL routine could be rewritten to force a circuit to use a different combination of logic gates to achieve the same function, or alter a data path to isolate a high toggle logic block.

Once an acceptable behavioral system model 30 is obtained based on data from power estimator 36 compared to a power target for the design, a logic synthesis technology map 38 can generate an "initial" gate level system model 39 from the high level system model, and the design can be examined at the gate level 54 where the design can then be modified to achieve power reduction. The gate level system model 39 contains a netlist, and the process of creating the netlist is often referred to as "logic synthesis." Popular logic synthesis tools include BooleDozer™ by IBM and Design Compiler™ by Synopsis, Inc. The format and use of netlists and other gate level representations are well known in the art and most commonly utilize the EDIF format.

Similar to the behavioral level, and as described in FIG. 1, a gate level simulation process 37 can be used to generate "gate level" weighted net toggle information 44 to further refine the ASIC design. The "gate level" weighted net toggle information 44 can be used: (1) by the Physical Design Place & Route process 40 to cause a placement solution that minimizes power; (2) by the automatic Low Power Optimization routines 43 in the synthesis tool to modify the gate level model to reduce power; and (3) by the Power Calculator 46 to calculate the power in order to yield the most accurate power consumption under average operating conditions.

The first mechanism for using the weighted net toggle counts 44 to reduce power at the gate level involves the Physical Design Place & Route process 40. The Physical Design Place & Route process 40 is used to place each of the gates within the ASIC and physically route all of the nets that interconnect the gates. It is also used to generate capacitance and resistance data 48 of all of the net connections. In the past, the primary goal of the placement process 40 was to find a location for all of the gates to meet timing objectives. However, the present invention takes advantage of the fact that the Physical Design Place & Route process 40 determines the length of interconnect wires in order to optimize power usage. Since power is directly proportional to wire capacitance, which is proportional to wire length, the Physical Design Place & Route process 40 can be directed to minimize the length of those nets that have the highest weighted net toggle counts. Given two timing equivalent placement alternatives, the placement tool can choose the one that reduces the capacitance of the high toggle nets.

Other examples of optimizations that can be done during the physical design place and route step 40 include: (1) placing cells that have high weighted net toggle counts close together to reduce wiring capacitance and power; (2) routing high weighted net toggle count nets first, in order to reduce the overall length these nets and power; (3) spacing high weighted net toggle count nets to greater than minimum, in order to reduce line-to-line capacitance and power; and (4) placing flip/flop latches close together to reduce clock wiring capacitance and power.

Figure 3:
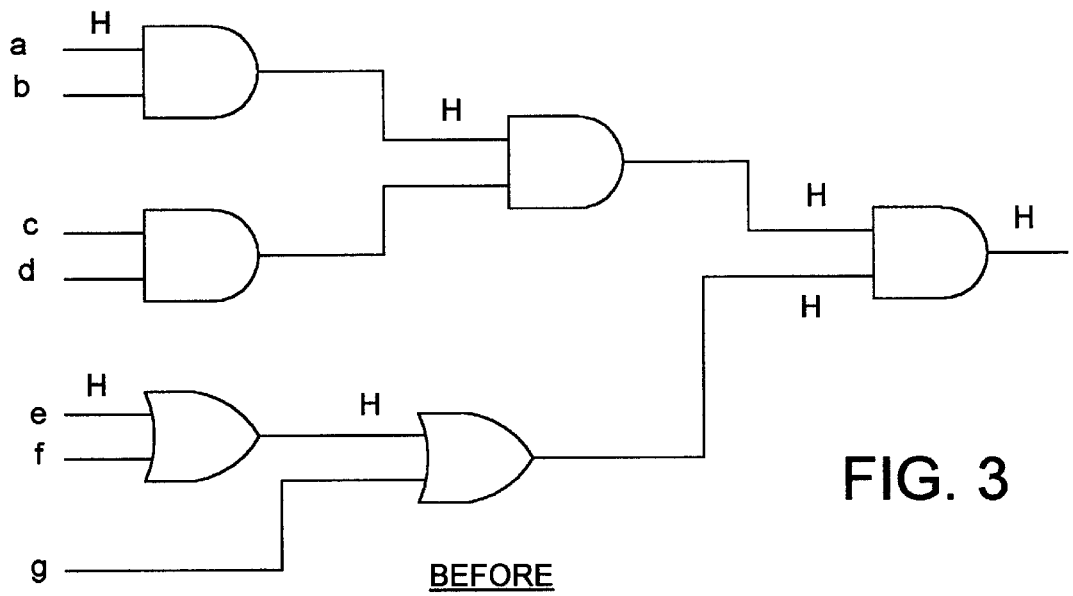
FIGS. 3 and 4 depict an example of how a synthesis tool can create logically equivalent circuits to reduce power in accordance with an exemplary embodiment of the invention.
Figure 4:
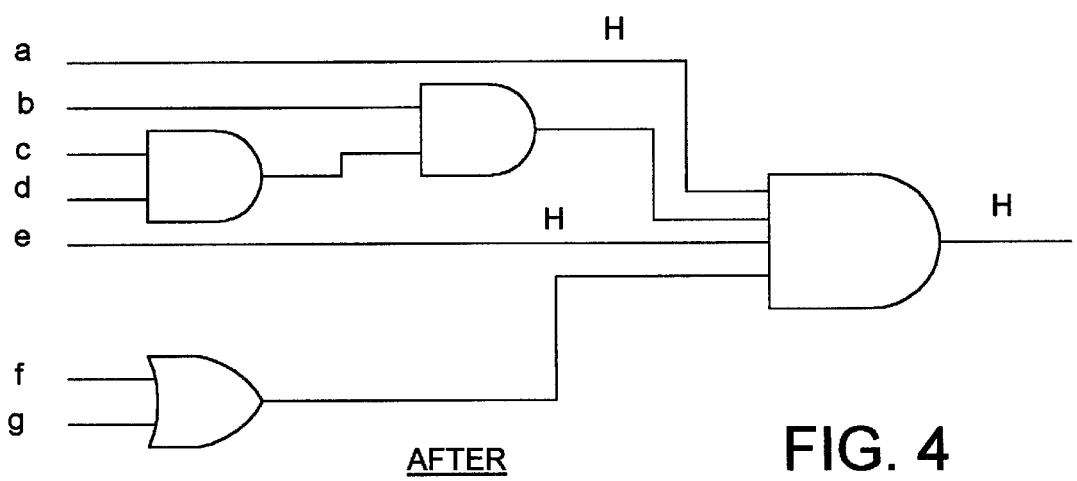

The second mechanism for using the weighted net toggle counts 44 to reduce power at the gate level involves the automatic low power optimization routines 43 available in the synthesis tools. In FIGS. 3 and 4, it can be seen that a second logically equivalent circuit (FIG. 4) can be construction to replace a first circuit (FIG. 3), and will utilize fewer high toggle nets. In FIG. 3, inputs a and e are high toggle nets and by moving them forward in the logic cone, the number of nets with high toggle counts is reduced. As is evident from FIGS. 3 and 4, the first circuit comprises seven high toggle nets (H), while the second logically equivalent circuit comprises only three. In a similar manner, heavily toggled nets can be moved forward in a logic cone to minimize the propagation of the toggle through the network. A logic comprises a collection of logic blocks that terminate at a single point, such as an output latch. By placing high toggle nodes close to the termination point, previous blocks will remain unaffected. Thus, such a logically equivalent logic network will consume less power than the original when running typical application code.

Figure 5:
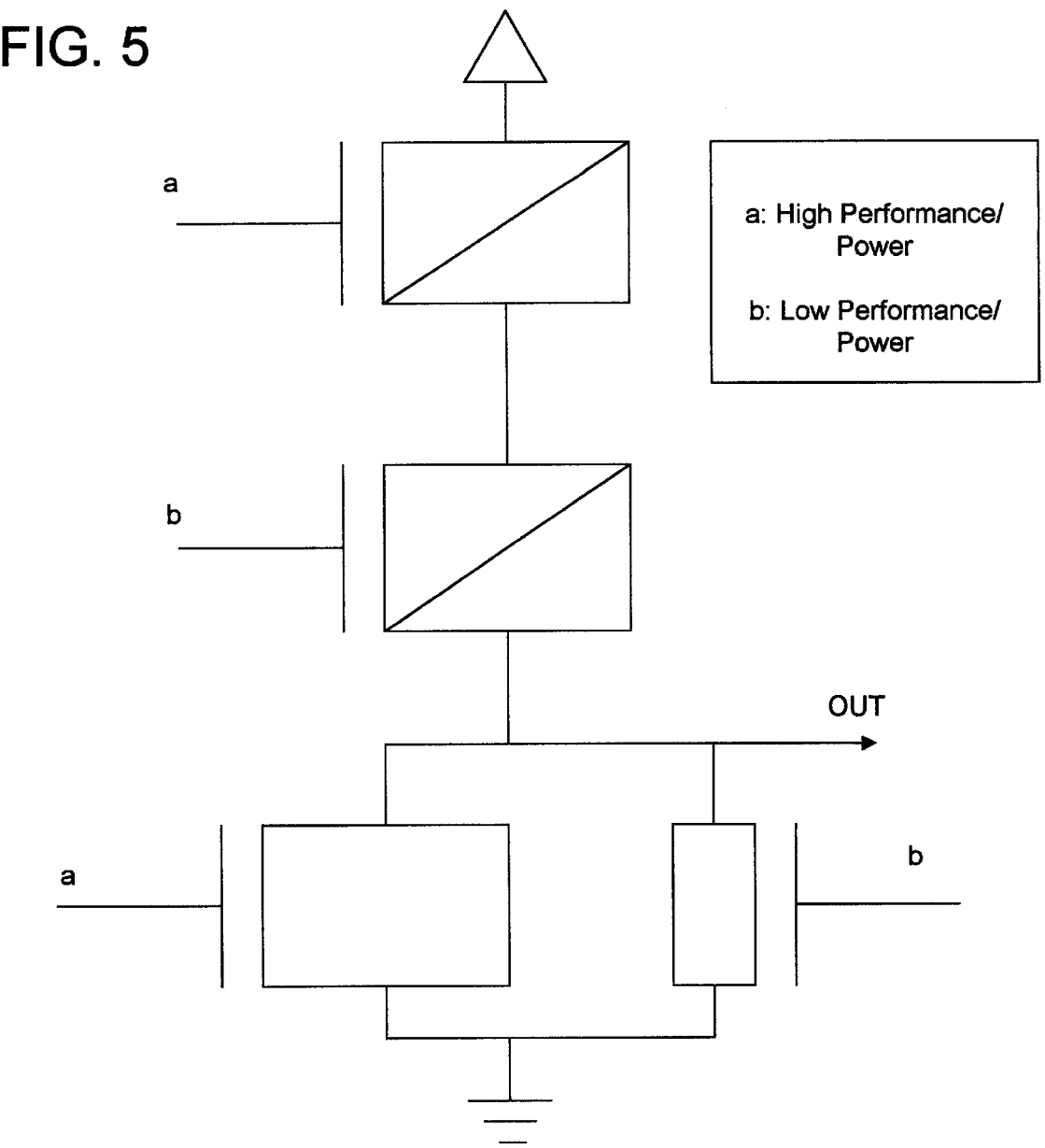
FIG. 5 depicts a NOR gate with high and low power input pins.
Figure 5:
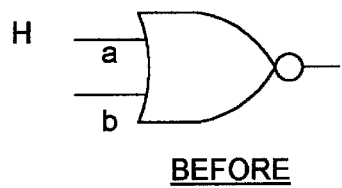
Figure 5:
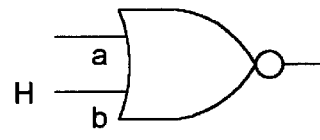

A second method would be to change the design netlist input pin connectivity on logically equivalent pins to the lowest input capacitance pin on heavily toggled nets. This can be easily accomplished since most ASIC library cells have different input pin capacitances either due to layout differences or input pin device width differences. This is shown in FIG. 5, where it can be seen that a typical NOR circuit contains an input "a" that operates with high performance and power, and an input "b" that operates with low performance and power. By letting input "b" handle the high toggle net H, a decrease in power is achieved. An ASIC library can also be designed to provide low power input pins. A third method to achieve power reduction using automated optimization routines would be to use the weighted net toggle information to drive the block power selection to power down those books that unnecessarily consume large amounts of power. Based on available timing slack on a logic path, the high toggling books can be prioritized to power down over others. This methodology is presently available in IBM's POWER CALC tool, and is described in part in U.S. Pat. No. 4,698,760, "Method Of Optimizing Signal Timing Delays And Power Consumption in LSI Circuits," Lembach et al., Oct. 6, 1987, which is hereby incorporated by reference.

The third mechanism in which weighted net toggle counts can be used at the gate level to optimize for power involves the use of a Power Calculator 46, such as those found in the logic synthesis tools described above. Once a gate level netlist exists, and the circuits have been placed and routed, the RC & Capacitance parasitic data (capacitance "C" and resistance "R") 48 can be obtained. The Power Calculator 46 can examine the RC & Capacitance data 48, along with the weighted net toggle information 44 to provide details of the power consumption of the ASIC design. Such details may include a power factor assigned to each net in the design which represents the relative amount of power used by each of the nets. The results of Power Calculator 46 can therefore be used in at least two ways. First, manual changes can be made based on power calculator net reports. Second, the power calculator program can automatically adjust the power level of the gates in order to perform slew rate driven power optimizations.

The foregoing descriptions of the exemplary embodiment of the invention have been presented for purposes of illustration and description. They are not intended to be exhaustive or to limit the invention to the precise form disclosed, and obviously many modification and variations are possible in light of the above teachings. Such modifications and variations that may be apparent to a person skilled in the art are intended to be included with the scope of this invention as defined by the accompanying claims.

We claim:

1. A method of automatically optimizing a circuit design for low power consumption, said circuit design having a plurality of nets, the method comprising the machine-implemented steps of:

a) running a functional simulation of the circuit design on a simulator; and b) identifying and applying a first application weighting factor to high toggle nets during the functional simulation step, including calculating a power factor for each of the nets based on a capacitance of the nets and on an amount of toggle imposed on the nets by an application to be implemented by the circuit design, wherein said first application weighting factor is an estimate of how often the application will be executed with respect to other applications.

2. The method of claim 1 further comprising the steps of:

c) synthesizing a gate level model of the circuit design based on a weighting of the nets according to their corresponding power factors and according to power consumption targets of the circuit design;

d) running a gate level simulation of the gate level model on the simulator;

e) identifying and applying a second application weighting factor to high toggle nets during the gate level simulation step, including calculating a second power factor for each of the nets based on the capacitance of the nets and on the amount of toggle imposed on the nets by the application to be implemented by the circuit design, wherein said second application weighting factor is an estimate of how often the application will be executed with respect to other applications; and f) repeating steps c)–e) until a satisfactory circuit design is obtained.

* * * * *